US 6,678,217 B2

(12) United States Patent
Bastruk

(10) Patent No.: US 6,678,217 B2
(45) Date of Patent: Jan. 13, 2004

(54) DISPLAY ASSEMBLY WITH CHROMATIC CONTRAST INVERSION

(75) Inventor: Naci Bastruk, Enges (CH)

(73) Assignee: Asulab S.A., Bienne (CH)

(*) Notice: Subject to any disclaimer, the term of this patent is extended or adjusted under 35 U.S.C. 154(b) by 309 days.

(21) Appl. No.: 09/855,589

(22) Filed: May 16, 2001

(65) Prior Publication Data

US 2002/0027833 A1 Mar. 7, 2002

(30) Foreign Application Priority Data

May 16, 2000 (CH) .............................. 0968/00

(51) Int. Cl.⁷ .............................. G04C 17/00
(52) U.S. Cl. .................. 368/84; 368/242; 349/97
(58) Field of Search .................. 368/84, 223, 242; 345/4, 5; 349/56, 58, 96

(56) References Cited

U.S. PATENT DOCUMENTS

| 4,568,928 | A | * | 2/1986 | Biferno ..................... 345/5 |
| 6,147,937 | A | * | 11/2000 | Arikawa et al. ............ 368/242 |
| 6,181,301 | B1 | * | 1/2001 | Inoguchi et al. ............ 345/5 |
| 6,185,161 | B1 | * | 2/2001 | Arikawa et al. ............ 368/84 |
| 6,292,439 | B1 | * | 9/2001 | Akiba et al. ............... 368/84 |
| 6,437,840 | B1 | * | 8/2002 | Arikawa et al. ............ 349/96 |
| 6,515,942 | B2 | * | 2/2003 | Basturk .................... 368/84 |
| 2002/0048221 | A1 | * | 4/2002 | Basturk .................... 368/84 |

FOREIGN PATENT DOCUMENTS

| DE | 30 34 181 A | 3/1982 |
| EP | 0 052 000 A | 5/1982 |
| EP | 0 926 574 A | 6/1999 |
| EP | 0 930 522 A | 7/1999 |
| JP | 11-142837 A | 5/1999 |

* cited by examiner

Primary Examiner—David Martin
Assistant Examiner—Jeanne-Marguerite Goodwin
(74) Attorney, Agent, or Firm—Griffin & Szipl

(57) ABSTRACT

The assembly includes a first display device (22) in front of which is arranged a second active liquid crystal display device including, starting from the exterior, a front polarizer (11) selective of a first color "V", a liquid crystal display cell (26) which is switchable ON/OFF, an intermediate polarizer (13) selective of a second color "R", an ON/OFF switchable optical liquid crystal valve (28) and a rear polarizer (15), which is reflective when the first display device (22) has a dark background and absorbent when it has a light background. A control unit (23) allows two switching states to be selected allowing the color of the information displayed, or that of the background on which said information is displayed to be reversed. Application to the display of information in a timepiece.

12 Claims, 2 Drawing Sheets

DISPLAY ASSEMBLY WITH CHROMATIC CONTRAST INVERSION

FIELD OF THE INVENTION

The present invention concerns a display assembly allowing a chromatic contrast inversion to be obtained by means of two superposed display devices including a first display device in front of which is located a second display device formed by a particular arrangement of fixed polarisers and liquid crystal cells the switching configurations of which control the chromatic inversion.

The invention also concerns a timepiece provided with such a display arrangement wherein the first display device is formed by the dial of said timepiece.

BACKGROUND OF THE INVENTION

The invention concerns more particularly a timepiece of this type wherein the dial includes an analogue display device of the current time on a dark background, the second display device being provided to supply other time-related or non time-related information, said information being able to be observed in two different colours.

A display assembly including two superposed display devices is already known from European Patent No. EP 0 926 574 in the name of the Applicant, the device oriented towards the observer being able to take two different states in which one of the display devices is visible to the exclusion of the other. Such a display assembly incorporated in a wristwatch is shown schematically in FIG. 1 and the operating principle thereof is given in FIG. 2.

The watch shown in FIG. 1, designated by the general reference 1, includes in a conventional manner, a middle part 2, a back cover 3 and a crystal 20 together delimiting a case in the bottom part of which are arranged an electronic watch movement 4 powered by a battery 5. Movement 4 includes an electronic time-keeping circuit associated with a drive device (not shown), hands 12, 14 and 16 for the hours, minutes and seconds, moving above a dial 18 carrying hour symbols (not shown).

Hands 12, 14 and 16 and dial 18 constitute the first display device, which is of the analogue type in the example illustrated, designated by the general reference 22.

This wristwatch 1 further includes a second display device of the digital type, designated by the general reference 24 and arranged between dial 18 and crystal 20. With reference again to FIG. 2, it can be seen that the second display device 24 is formed of a sandwich type structure including, moving from crystal 20 to dial 18, an absorbent linear polariser 40, a liquid crystal display cell 26, an absorbent linear polariser 42 crossed with respect to polariser 40, a liquid crystal optical valve 28 and a reflective polariser 44 crossed with respect to polariser 42. The switching states of the cell and the valve of the second display device are controlled by a control unit 23 as a function of manipulations effected on at least one external control member 9.

Display cell 26 includes in a conventional manner a transparent front substrate 30, a rear substrate 32 which is also transparent and a sealing frame 34 forming spacing and closing means delimiting with substrates 30 and 32 a closed cavity containing liquid crystals 27. The opposite faces of substrates 30 and 32 include transparent electrodes respectively 36 and 38 made for example of ITO. In the example illustrated, rear electrode 38 extends over the entire surface of substrate 32 and front electrode 36 is configured in digits which can be addressed separately by means of control unit 23, the activated (ON) or non-activated (OFF) state being symbolised by contactor 6 (FIG. 2). This cell 26 thus allowing alphanumerical characters to be displayed by passing liquid crystals 27 from a transparent state to an absorbent state, or conversely depending on the type of liquid crystals used. As will be understood hereinafter, in the application to a wristwatch where energy saving is of great importance, one will prefer to use liquid crystals which give the cell a transparent state when no voltage is applied and an absorbent state when voltage is applied.

Optical valve 28, containing liquid crystals 29 and having a contactor 8, has a comparable structure to that of cell 26 and differs therefrom only in that the two transparent electrodes totally cover the opposite faces of top substrate 31 and bottom substrate 33, so that valve 28 can pass from a totally transparent state to a totally absorbent state, or conversely depending upon the type of liquid crystals used. For the reason indicated previously, liquid crystals 29 will preferably be selected so as to have a transparent state in the absence of any voltage.

The examples disclosed in European Patent No. EP 0 926 574 only suggest, for the object sought by this invention, two switching configurations. In the OFF-OFF configuration, shown in FIG. 2, the reader will easily understand by following the path of the light rays through polarisers 40, 42, 44 and in an intermediate way cell 26 and valve 28, that the analogue display dial 18 is visible, whether it is light or dark in colour. According to a second configuration ON-ON, which is not shown, the display background is formed by reflective polariser 44, because of the rotation of 90° imported by valve 28 on the polarised incident light, and the display digits appear in a dark colour because of the absorption by polariser 42 of the incident rays having undergone a rotation of 90° passing through said activated digits of cell 26, so that the second display device appears in a dark colour on a mirrored background. This change of switching state from OFF-OFF to ON-ON allows an inversion of the display type to be obtained, but not a contrast inversion and even less so a chromatic contrast. The same would apply by modifying the relative orientation of the polarisers. In order to try to obtain a contrast inversion, even without any chromatic effect, those skilled in the art may naturally think of trying, without modifying the construction disclosed by the aforecited document, the ON-OFF configuration. With respect to the aforecited ON-ON configuration, the second display device is unchanged, and appears on the dial background instead of the mirrored background, but there is no contrast inversion.

The object of the present invention is thus to provide a particular arrangement allowing the colour of the displayed information or that of the background on which it is displayed to be reversed with another.

SUMMARY OF THE INVENTION

The invention therefore concerns a display assembly including a first display device in front of which is arranged a second active liquid crystal display device. This second display device is characterised in that it includes, moving from the exterior to the first display device a front first colour selective polariser, a liquid crystal dot-matrix or digit display cell, an intermediate second colour selective polariser, a liquid crystal optical valve and a rear polariser which is reflective if the first display device has a dark background, and absorbent if the first display device has a light background. A control unit allows two switching states to be selected for the cell and two switching states for the valve producing a chromatic inversion, either as regards the displayed information, or as regards the background on which said information is displayed. When the intermediate polariser is crossed with respect to the front polariser and with respect to the rear polariser, the chromatic inversion is observed as regards the information. When the intermediate polariser is parallel to the two other polarisers, the chromatic inversion is observed as regards the background. In order to obtain the best possible contrast, it is preferable to select two complementary colours for the front and intermediate selective polarisers.

According to another aspect of the invention, when the cell is not switched (OFF state) thus supplying no information, and as a function of the switching state (ON/OFF) of the valve, the display assembly allows the first display device only to be made visible or to be totally masked by a mirror mask. As will be seen in the following detailed description, this display assembly is particularly well suited to a wristwatch, since it is possible to have an OFF-OFF switching configuration which does not consume energy and which allows information as to the current time to be permanently visible on the first display device, and to be able to make two other types of information appear as required on the second display device, which can be differentiated easily by the chromatic inversion. This information can be complementary time-related information to those given by the first display device, or non time-related information such as values measured by sensor systems contained in the timepiece case.

BRIEF DESCRIPTION OF THE DRAWINGS

Other features and advantages of the present invention will appear more clearly upon reading the following embodiment and operating examples, with reference to the annexed drawings, in which.

DETAILED DESCRIPTION OF ILLUSTRATED EMBODIMENTS

Figure 1:
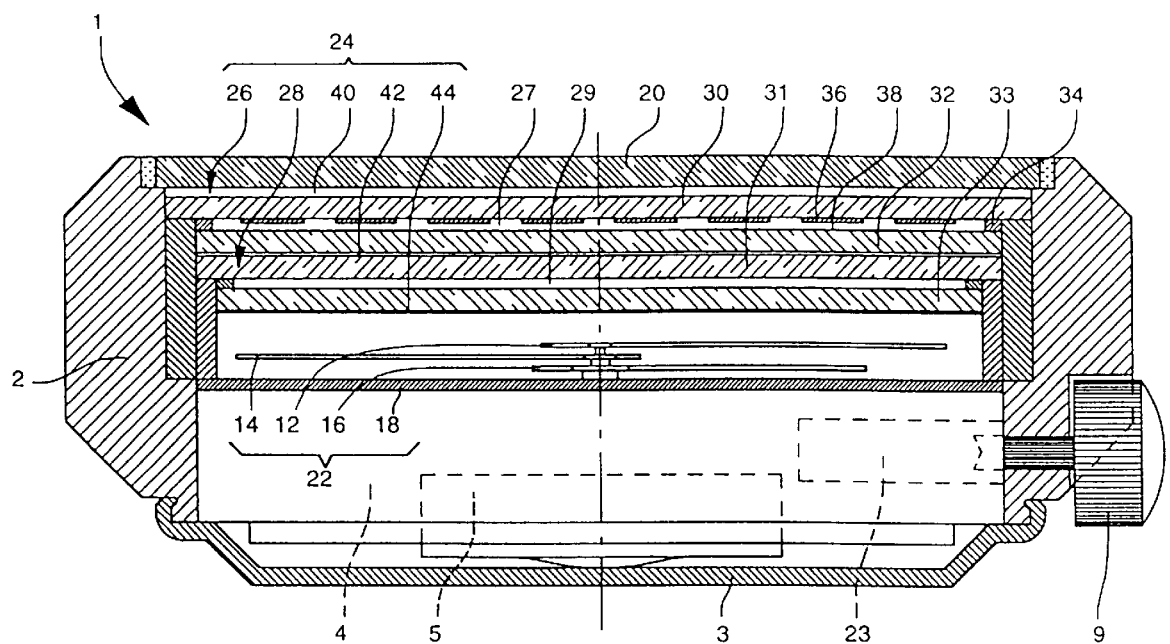
FIG. 1 is a cross-section of a wristwatch including a display assembly having two superposed display devices.
Figure 2:
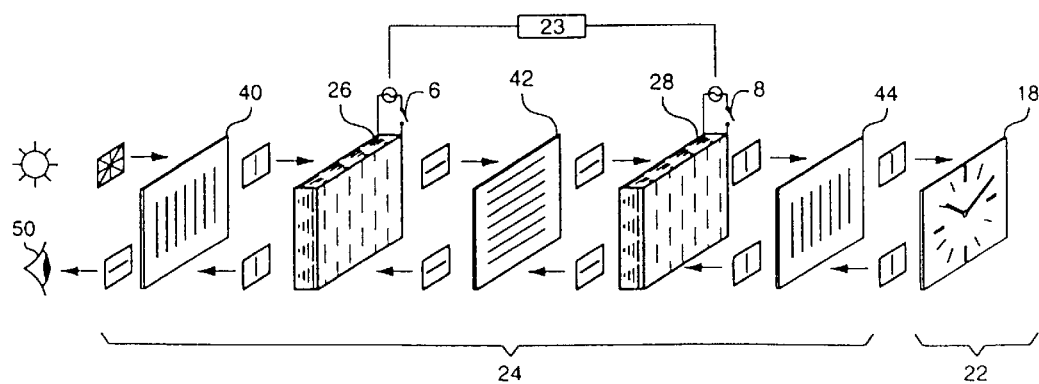
FIG. 2 is a schematic diagram of an operating mode according to the prior art.

The construction of the display assembly according to the present invention is comparable to that which was described with reference to FIG. 1 within the scope of the application to a wristwatch. However, it differs therefrom in that the front polariser is a selective polariser 11 of a first colour "V", the intermediate polariser is a selective polariser 13 of a second colour "R" and the rear polariser is a reflective polariser 15 if the first display device, now designated by the reference 17 has a dark colour and an absorbent polariser if the first display device has a light colour. As previously indicated, it thus includes a control unit 23 which, as a function of the manipulations effected on an external control member 9, will control the switching configurations by means of contactor 6 of valve 26 and contactor 8 of valve 28.

Figure 3:
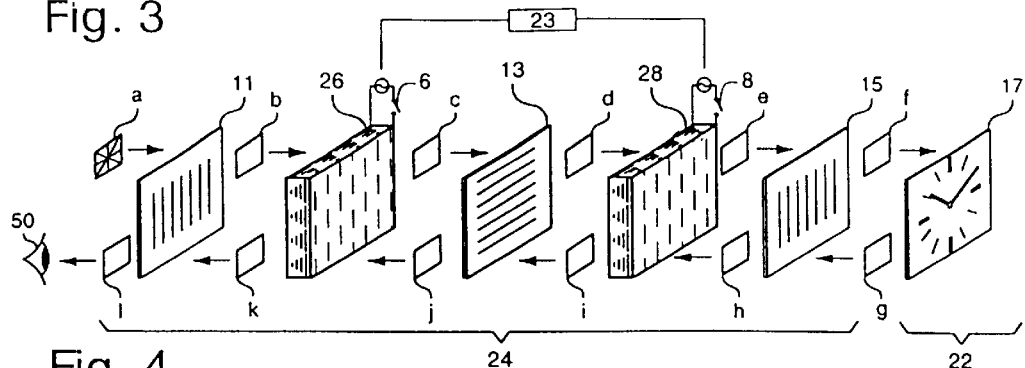
FIG. 3 is the explanatory diagram of an operating mode according to the invention.

In the first example which will be described, with reference to FIG. 3, intermediate polariser 13 is crossed with respect to front polariser 11 and rear polariser 15, the colours "V" and "R" being the complementary colours green and red, and the first display device is formed by a dark coloured analogue display dial.

The invention consists in exploiting in a surprising manner the imperfect nature of the colour selective polarisers both as regards polarisation and as regards the selection of a determined colour "V" or "R", as briefly resumed hereinafter for a green selective polariser.

A monochromatic non polarised green light passing through a green selective polariser globally undergoes a 50% polarisation so that the transmitted light is reconstituted as non polarised green light. If the incident light is polarised parallel to the axis of polarisation of the polariser, it is transmitted at 100%. If it is polarised perpendicular to the axis of polarisation, it is transmitted with the same polarisation but with a strong attenuation of x % which can be estimated at 5%.

If the incident light on the green selective polariser is now a monochromatic red light, it is transmitted along the axis of polarisation of the polariser with an attenuation of y % which can be estimated at 40%. If the red light is polarised parallel to the green polariser, it will be transmitted along the same axis of polarisation with a less strong attenuation of z % which can be estimated at 80%. If the red light is polarised perpendicular to the green polariser, it can be considered to be totally absorbed.

In a similar manner, attenuation coefficients x, y, z are found for a red or green incident light on a red selective polariser.

As regards the first display device, when it is dark coloured it is considered to reflect only w % of the incident light, whatever its wavelength, this value being able to be estimated at 2%. When it is light coloured, it may be considered to reflect the light at 100%. Finally, the reflective polariser will be considered to transmit, whatever the wavelength 100% of the polarised light along its polarisation axes and conversely reflect 100% of the perpendicularly polarised light.

It is clear that, as will be seen in the following examples the combination of these different coefficients will determine a global indicative attenuation rate, i.e. a dominant green or red colour, but that this rate does not correspond to the luminous intensity observed given that account must also be taken of the other wavelengths of the natural non polarised light and the eye's own sensitivity to each wavelength.

EXAMPLE 1

In a first embodiment corresponding to the diagram of FIG. 3, already described, a non polarised light which will be considered, for the sake of clarity hereinafter, as being composed solely of green "V" and red "R", is represented by a rectangle designated by the letter a, at the front. The following rectangles, designated by the letters b and l represent the states of two wavelengths "V" and "R" after each constitutive element of the display assembly, until rectangle l which corresponds to the effect which may be observed. In table 1 hereinafter, the different states of a to l are recorded for a first switching configuration OFF-OFF, corresponding to FIGS. 3 and 4 and for a second switching configuration ON-OFF corresponding to FIG. 5.

TABLE 1

| | | C26, OFF/V28, OFF | | | | C26, ON/V28, OFF | | | |
|---|---|---|---|---|---|---|---|---|---|
| P11↕ | a | V | * | R | * | V | * | R | * |
| C26 | b | V | * | yR | ↕ | V | * | yR | ↕ |
| P13↔ | c | V | * | yR | ↔ | V | * | yR | ↕ |
| V28 | d | yV | ↔ | yR | ↔ | yV | ↔ | xyR | ↕ |
| P15↕ | e | yV | ↕ | yR | ↕ | yV | ↕ | xyR | ↔ |
| Dial 17 | f | yV | ↕ | yR | ↕ | yV | ↕ | X | |
| P15 | g | wyV | ↕ | wyR | ↕ | wyV | ↕ | X | |
| V28 | h | wyV | ↕ | wyR | ↕ | wyV | ↕ | xyR | ↔ |
| P13↔ | i | wyV | ↔ | wyR | ↔ | wyV | ↔ | xyR | ↕ |
| C26 | j | wyzV | ↔ | wyR | ↔ | wyzV | ↔ | x²yR | ↕ |
| P11↕ | k | wyzV | ↕ | wyR | ↕ | wyzV | ↔ | x²yR | ↕ |
| | l | wyzV | ↕ | wyzR | ↕ | wxyzV | ↔ | x²yzR | ↕ |
| Attenuation rate example in % | | 0.64 V % | | 0.64 R % | | 0.032 V % | | 0.080 R % | |

In the OFF-OFF configuration, the colour green "V" is not modified up to red selective polariser P13 where it is polarised horizontally and attenuated by a coefficient y. In state e, valve 28 has imported a rotation of 90° and the green light is then polarised parallel to the axis of reflective polariser 15 through which it passes to strike dial 17 and be reflected in state with a new attenuation w. It passes a second time without modification through polariser 15 then valve 28 undergoing a new rotation of 90°, so that it arrives in a state l with an axis of polarisation parallel to that g red selective polariser 13 through which it passes undergoing a new attenuation z. On passing through cell 26, its axis of polarisation is reoriented by 90° to reach a state k parallel to the axis of polarisation of green selective polariser 11 through which it passes without modification. The observable green component in state l can thus be expressed as wyzV.

By now following the path of red component "R", it can be seen that it is first in the b state polarised parallel to green selective polariser 11 undergoing an attenuation y, then in the c state undergoing a rotation of 90° passing through cell 26 to arrive with an axis of polarisation parallel to that of red selective polariser 13 through which it passes without modification. Valve 28 will import another rotation of 90° so that the red component passes through reflective polariser 15 without modification to be reflected by dial 17 in a state with a new attenuation w. Until the k state, valve 28 then cell 26 will import two rotations of 90° so that the red component arrives parallel to green selective polariser 11 through which it passes undergoing a new attenuation z. The observable red component in the l state may thus be expressed as wyzR. It is to be noted thus that the two green and red components "V" and "R" have undergone the same rates of attenuation "wyz", which recomposes the natural light, given that the same phenomenon will be generated for all the other pairs of colours/complementary colours, obviously with different rates of attenuation.

Figure 4:
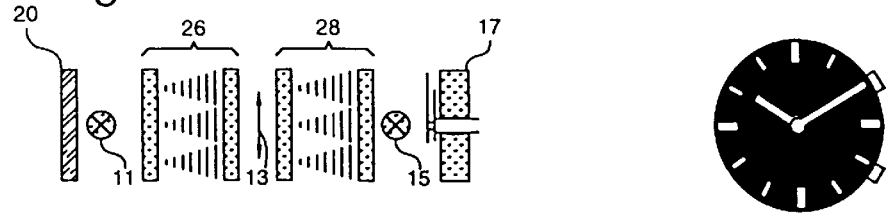
FIGS. 4 to 7 show schematically the four possible switching configurations of a display assembly according to the invention and the corresponding visual aspects.

Thus in the OFF-OFF switching configuration, dark dial 17 which forms the first display device is visible as shown in FIG. 4.

Figure 5:
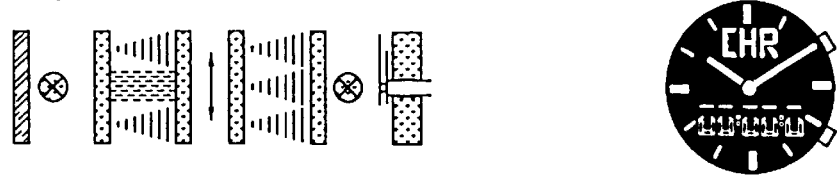

FIG. 5 shows the diagram of the ON-OFF switching configuration and the observable aspect of the display assembly. The two columns on the right of Table 1 give the states from a to l of the two green and red components "V" and "R" for the part of the display corresponding to the switched digits of cell 26.

Following the path of green component "V", as was done for the OFF-OFF switching configuration, it can be seen that it undergoes in succession the y attenuations in the d state, w in the a state and z in the l state, i.e. the observable green component may be expressed as wxyzv. Following now the path of the red component "R", it can be seen that it undergoes a y attenuation in the c state, another x attenuation in the e state, that it is reflected by reflective polariser 15 and that it again undergoes in succession the x attenuation in the l state and the z attenuation in the l state, so that the observable red component can be expressed as $x^2yzR$.

Keeping the mean values indicated at the beginning for the attenuation coefficients wxyz, it can be seen that the observable red component is expressed by 0.080R % and the green component by 0.032V %, i.e. that the red colour is dominant. In the ON-OFF switching configuration, the information of the second display device thus appears in red on the dark background of the dial.

Reference will now be made to the explanatory diagrams of FIGS. 6 and 7 and to Table 2 hereinbelow.

TABLE 2

| | | C26, OFF/V28, ON | | | | C26, ON/V28, ON | | | |
|---|---|---|---|---|---|---|---|---|---|
| P11↕ | a | V | * | R | * | V | * | R | * |
| C26 | b | V | * | yR | ↕ | V | * | yR | ↕ |
| P13↔ | c | V | * | yR | ↔ | V | * | yR | ↕ |
| V28 | d | yV | ↔ | yR | ↔ | yV | ↔ | xyR | ↕ |
| P15↕ | e | yV | ↔ | yR | ↔ | yV | ↔ | xyR | ↕ |
| Dial 17 | f | X | | X | | X | | xyR | ↕ |
| P15 | g | X | | X | | X | | wxyR | ↕ |
| V28 | h | yV | ↔ | yR | ↔ | yV | ↔ | wxyR | ↕ |
| P13↔ | i | yV | ↔ | yR | ↔ | yV | ↔ | wxyR | ↕ |
| C26 | j | yzV | ↔ | yR | ↔ | yzV | ↔ | wx²yR | ↕ |
| P11↕ | k | yzV | ↕ | yR | ↕ | yzV | ↔ | wx²yR | ↕ |
| | l | yzV | ↕ | yzR | ↕ | xyzV | ↔ | wx²yzR | ↕ |
| Attenuation rate example in % | | 32 V % | | 32 R % | | 1.6 V % | | 0,0016 R % | |

Figure 6:
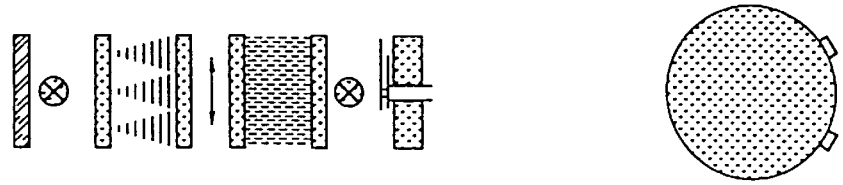

The OFF-ON switching configuration, in which no information can be displayed by cell 26, corresponds to FIG. 6 and to the first two columns of Table 2. By following, as previously, the path of the green component and the red component, it can be seen that the switching ON of valve 28 orients the polarisation of the two red and green components perpendicular to the axis of polarisation of reflective polariser 15 so that they will both be reflected and will be in the L state with the same rates of attenuation yz, i.e., as indicated previously, they will allow the natural light to be recomposed. In this configuration, no information is displayed and the observer sees only a mirrored background, which may be a desired aesthetic effect, in particular in a timepiece.

Figure 7:
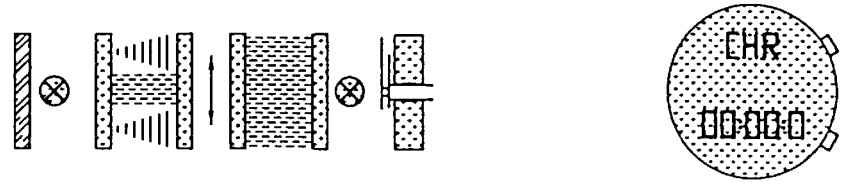

The ON-ON configuration corresponds to FIG. 7 and to the first two columns of Table 2. It can be seen that the green component undergoes a first attenuation y in the d state, that it is reflected by reflective polariser 15, then undergoes in succession two attenuations, z in the l state and x in the l state, so that the observable green component can be expressed as xyzV. The red component undergoes a succession of attenuations, including by the dark colour of dial 17, so that the observable red component in l can be expressed as $wx^2yzR$. By keeping the values indicated at the beginning for the attenuation coefficients, it is to be noted that the green component is very clearly dominant. In this ON-ON switching configuration, the information of the second display device thus appears in green on a mirrored background.

Thus by passing from an ON-OFF switching configuration to an ON-ON configuration, it can be seen that the display assembly according to the invention allows the colour of the information displayed by the second display device to be switched from red to green.

Figure 8:
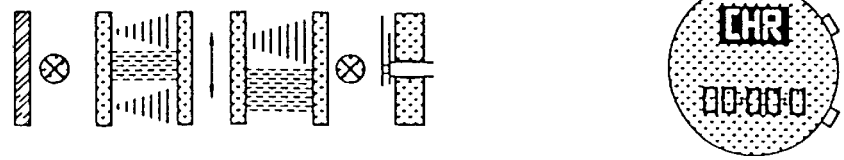
FIG. 8 shows an embodiment in which a switching configuration allows a double chromatic inversion to be obtained.

Finally, with reference to FIG. 8, it can be seen that it is possible to provide at least two opposite switching zones on valve 28, so that the same display assembly allows red information to be displayed on a dark background and green information on a mirrored background at the same time.

EXAMPLE 2

In this embodiment, intermediate polariser 13 which selects the colour red is parallel both to front polariser 11 which selects the colour green and to reflective rear polariser 15. This construction is not shown in a Figure since it may be easily understood from the diagram of FIG. 3, simply by rotating the intermediate polariser by 90°. This embodiment allows a chromatic inversion of the background on which the information of the second display device is displayed to be obtained, as is briefly explained with reference to Table 3 corresponding to two switching configurations OFF-OFF and ON-ON.

TABLE 3

| | | C26, OFF/V28, OFF | | | | C26, ON/V28, ON | | |
|---|---|---|---|---|---|---|---|---|
| P11↕ | a | V | * | R | * | V | * | R | * |
| C26 | b | V | * | yR | ↕ | V | * | yR | ↕ |
| P13↔ | c | V | * | yR | ↔ | V | * | yR | ↕ |
| V28 | d | yV | ↕ | xyR | ↔ | yV | ↔ | yR | ↕ |
| P15↕ | e | yV | ↔ | xyR | ↕ | yV | ↔ | yR | ↕ |
| Dial 17 | f | X | | xyR | ↕ | yV | | yR | ↕ |
| P15 | g | X | | xyR | ↕ | wyV | | wyR | ↕ |
| V28 | h | yV | ↔ | wxyR | ↕ | wyV | ↕ | wyR | ↕ |
| P13↔ | i | yV | ↕ | wxyR | ↔ | wyV | ↔ | wyR | ↕ |
| C26 | j | yzV | ↕ | wxyR | ↔ | wyzV | ↔ | wyR | ↕ |
| P11↕ | k | yzV | ↔ | $wx^2yR$ | ↕ | wyzV | ↔ | wyR | ↕ |
| | l | xyzV | ↔ | $wx^2yR$ | ↕ | wyzV | ↔ | wyzR | ↕ |
| Attenuation rate example in % | | 1.6 V % | | 0.002 R % | | 0.64 V % | | 0.64 R % | |

In the OFF-OFF configuration corresponding to the first two columns of Table 3, in which the second display does not supply any information, it can be seen that the green component is reflected by reflective polariser 15 and that it is observable in the "l" state with an attenuation coefficient of xyz. The red component strikes the dark dial and undergoes a large number of attenuations so that it is observable in the "l" state with an attenuation coefficient of $wx^2yz$. It will be noted that these attenuation coefficients are identical to those obtained in the ON-ON configuration of example 1, but that the dominant green colour forms the background of the display given that cell 26 switched OFF does not supply any information.

In the ON-ON configuration, corresponding to the last two columns of Table 3, it will be observed that the attenuation coefficients of the two green and red components are identical and equal to those observed in the OFF-OFF state of example 1, so that the switched digits of cell 26 allow the dark background of dial 17 to be seen. In other words, this configuration allows the information supplied by the second display to be appear in a dark colour on a green background.

Without it being necessary to refer to a new table, the reader will understand that the OFF-ON configuration allows a red coloured background to be obtained with the same attenuation coefficients in the ON-OFF state of example 1, and that the ON-OFF configuration of this embodiment, which has the same alternation coefficients as the OFF-On configuration of example 1 allows windows to be created at each activated digit, allowing a mirrored background to appear, so that the information supplied by the second display device appears in a light colour and a red background.

Thus, it can be seen that this embodiment allows a chromatic inversion of the background on which the information appears, by passing from an ON-ON switching configuration to an ON-OFF configuration or conversely.

Of course, as was shown with reference to FIG. 8 of example 1, it would also be possible to obtain a double chromatic inversion.

It will be noted finally that, even if the same attenuation coefficients are found with different switching configurations, the path of each of the green and red components, and in particular the axis of polarisation, may be different given the different relative orientation of the polarisers.

EXAMPLE 3

In this embodiment, intermediate polariser 13 which selects the colour red, is parallel to front polariser 11 which selects the colour green, and crossed with respect to reflective rear polariser 15. By following the teaching of the preceding examples, the reader will easily understand that the ON-OFF switching configuration allows the information to be displayed in a dark colour on a red background and the ON-ON configuration allows it to be displayed in a light colour on a green background, i.e. another chromatic inversion of the background on which the information is displayed to be obtained.

Likewise, with reference to what was said for example 2, the reader will understand that by exchanging the colours of selective polarisers 11 and 13 in examples 3 and 4, a chromatic inversion will again be obtained, for a given construction, the only difference being as regards the switching configurations.

EXAMPLE 4

In the embodiment which will be described, front polariser 11 is selective of green colour "V", intermediate polariser 13 is selective of red colour "R" by being crossed with respect to front polariser 11, rear polariser 15 is absorbent being crossed with respect to intermediate polariser 13 (i.e. parallel to front polariser 11) and the first display is formed by a dial 17 with a light coloured analogue display. As indicated at the beginning, the "w" attenuation coefficient of the dial can be evaluated at the value 1 for a light colour. This construction is that shown in FIG. 3, and the chromatic inversion which it allows to be obtained is explained with reference to Tables 4 and 5 hereinbelow, in which the "w" coefficient of value 1 is not reported.

TABLE 4

|  |  | C26, OFF/V28, OFF | | | C26, ON/V28, OFF | | | |
|---|---|---|---|---|---|---|---|---|
| P11↕ | a | V | * | R | * | V | * | R | * |
| C26 | b | V | * | yR | ↕ | V | * | yR | ↕ |
| P13↔ | c | V | * | yR | ↔ | V | * | yR | ↕ |
| V28 | d | yV | ↔ | yR | ↔ | yV | ↔ | xyR | ↕ |
| P15↕ | e | yV | ↕ | yR | ↕ | yV | ↕ | xyR | ↔ |
| Cadran 17 | f | yV | ↕ | yR | ↕ | yV | ↕ | | |
| P15 | g | yV | ↕ | yR | ↕ | yV | ↕ | | |
| V28 | h | yV | ↕ | yR | ↕ | yV | ↕ | | |
| P13↔ | i | yV | ↔ | yR | ↔ | yV | ↔ | | |
| C26 | j | yzV | ↔ | yR | ↔ | yzV | ↔ | | |
| P11↕ | k | yzV | ↕ | yR | ↕ | yzV | ↕ | ↔ | |
|  | l | yzV | ↕ | yzR | ↕ | xyzV | ↔ | | |
| Attenuation rate example in % | | 32 V % | | 32 V % | | 1.6 V % | | 0 R % | |

The two columns on the left correspond to the OFF-OFF switching configuration. As can be seen, the green component "V" undergoes an attenuation y in d and an attenuation z in i to be observable in l with an attenuation coefficient yz. Likewise, the red component "R" undergoes an attenuation y in b and an attenuation z in l so that it is observable with an attenuation yz. As the two components have the same attenuation rates, the natural light is reconstituted and light coloured dial 17 is visible.

In the ON-OFF configuration corresponding to the two columns on the right, the green component "V" undergoes in succession the attenuations y in d, z in j and x in l to appear to the observer with an attenuation rate xyz. The red component undergoes an attenuation y in b being polarised parallel to selective polariser 11, then an attenuation x in d. Its axis of polarisation is rotated by 90° in e, so that it strikes absorbent polariser 15 perpendicular to its axis of polarisation and is totally absorbed. In this switching configuration, the colour green is the dominant colour of the switched digits, and thus of the information displayed which appears in green on a light coloured background of the dial.

TABLE 5

|  |  | C26, OFF/V28, ON | | | C26, ON/V28, ON | | | |
|---|---|---|---|---|---|---|---|---|
| P11↕ | a | V | * | R | * | V | * | R | * |
| C26 | b | V | * | yR | ↕ | V | * | yR | ↕ |
| P13↔ | c | V | * | yR | ↔ | V | * | yR | ↕ |
| V28 | d | yV | ↔ | yR | ↔ | yV | ↔ | xyR | ↕ |

TABLE 5-continued

|  |  | C26, OFF/V28, ON | | | C26, ON/V28, ON | | | |
|---|---|---|---|---|---|---|---|---|
| P15↕ | e | yV | ↔ | yR | ↔ | yV | ↔ | xyR | ↕ |
| Dial 17 | f | | | | | | | xyR | ↕ |
| P15 | g | | | | | | | xyR | ↕ |
| V28 | h | | | | | | | xyR | ↕ |
| P13↔ | i | | | | | | | xyR | ↕ |
| C26 | j | | | | | | | $x^2$yR | ↕ |
| P11↕ | k | | | | | | | $x^2$yR | ↕ |
|  | l | | | | | | | $x^2$yzR | ↕ |
| Attenuation rate example in % | | 0 V % | | 0 R % | | 0 V % | | 0.08 R % | |

The two columns on the left correspond to the OFF-ON switching configuration. As can be seen, the two green and red components "V" and "R" strike at absorbent polariser 15 with a polarisation perpendicular to the axis of polarisation of said polariser, so that they are both absorbed and the background appears dark.

In the ON-ON configuration corresponding to the two columns on the right, the green component "V" is totally absorbed and the red component "R" undergoes an attenuation $x^2$yz. In this switching configuration, the red colour is the dominant colour of the switched digits, and thus of the information displayed which appears in red on a dark background.

By passing from an ON-OFF switching configuration to an ON-ON configuration, this embodiment thus allows a chromatic inversion to be obtained of the information displayed in green on a light coloured background, to red on a dark background.

As was explained in examples 2, 3 and 4, another chromatic inversion will be obtained by changing the order of the colour selective polarisers and/or their relative axis of polarisation.

What is claimed is:

1. A chromatic contrast inversion display assembly including a first display device in front of which is arranged a second active liquid crystal display device including, starting from the exterior, a front polariser, a liquid crystals $LC_1$ dot-matrix or digit display cell with two switching states, an intermediate polariser, a liquid crystals $LC_2$ optical valve having at least two switching states and a rear polariser, wherein four switching states of said cell and said valve are determined by a control unit, characterised in that in the second display device, the front polariser is selective of a first colour "V", the intermediate polariser is selective of a second colour "R" and the rear polariser is reflective when the first display device has a dark background and absorbent when the first display device has a light background and in that the control unit allows two switching states to be selected allowing the colour of the information displayed, or that of the background on which said information is displayed to be reversed.

2. A display assembly according to claim 1, wherein the intermediate polariser is crossed with respect to the front polariser and the rear polariser, the cell is in the ON state and in that the change of state of the valve from an ON state to an OFF state, or conversely, reverses the colours of the information given by the second display device.

3. A display assembly according to claim 2, wherein the two other switching configurations allow either the first display device to be made visible or said first display device to be totally masked.

4. A display assembly according to claim 1, wherein the front, intermediate and rear polarisers are parallel, the cell is in the OFF state and in that the change of state of the valve from an ON state to an OFF state, or conversely, reverses the colours of the background on which the information of the second display device appears.

5. A display assembly according to claim 1, wherein the first and second colours "V", "R" of the selective polarisers are complementary colours.

6. A display assembly according to claim 1, wherein the valve includes at least two distinct zones having opposite switching configurations allowing two types of information to be displayed in chromatic inversion.

7. A display assembly according to claim 1, wherein the liquid crystals $LC_1$ and $LC_2$ of the cell and of the valve, which are the same or different, are of the twisted nematic type with either a positive or a negative anisotropy.

8. A display assembly according to claim 1, wherein the first display device is selected from among an analogue display device, a digital display device and a combination of these two devices being also able to include a decorative element.

9. A display assembly according to claim 1, wherein the first display device has, totally or partially, the same structure as that of the second display device.

10. A timepiece including a case closed by a crystal and a back cover in which is housed a watch movement associated with at least a display device according to claim 1, said first display device displaying essentially time-related information and said second display device displaying complementary time-related information or non time-related information of sensor systems contained in the case of said timepiece.

11. A timepiece according to claim 10, wherein the first display device is of the analogue type.

12. A timepiece according to claim 10, wherein the second display device is integral with the crystal.

* * * * *